(12) United States Patent  
Akita et al.

(10) Patent No.: US 9,312,520 B2  
(45) Date of Patent: Apr. 12, 2016

(54) ELECTROCHEMICAL CELL PACKAGING MATERIAL

(75) Inventors: Hirohisa Akita, Tokyo (JP); Youichi Mochizuki, Tokyo (JP); Kazuhiko Yokota, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 13/388,683

(22) PCT Filed: Aug. 5, 2010

(86) PCT No.: PCT/JP2010/063260  
§ 371 (c)(1),  
(2), (4) Date: Feb. 3, 2012

(87) PCT Pub. No.: WO2011/016506  
PCT Pub. Date: Feb. 10, 2011

(65) Prior Publication Data  
US 2012/0135301 A1 May 31, 2012

(30) Foreign Application Priority Data

Aug. 7, 2009 (JP) ................................. 2009-184850  
Jul. 29, 2010 (JP) ................................. 2010-170323

(51) Int. Cl.  
*H01M 2/08* (2006.01)  
*H01M 2/02* (2006.01)  
(Continued)

(52) U.S. Cl.  
CPC . *H01M 2/02* (2013.01); *B32B 7/12* (2013.01); *B32B 15/08* (2013.01); *B32B 27/08* (2013.01);  
(Continued)

(58) Field of Classification Search  
CPC ... H01M 2/00; H01M 2/0257; H01M 2/0275; H01M 2/0287; H01M 2/0212; H01M 2/0267; H01M 2/0295; H01M 2/1094; H01M 2/344  
USPC .................................................. 429/185, 175  
See application file for complete search history.

(56) References Cited

U.S. PATENT DOCUMENTS 5,190,609 A 3/1993 Lin et al.  
6,003,670 A * 12/1999 Beer .......................... 206/459.5  
(Continued)

FOREIGN PATENT DOCUMENTS

CN 101276887 A 10/2008  
GB 2307897 A 6/1997  
(Continued)

OTHER PUBLICATIONS

Office Action dated Jun. 26, 2012 in corresponding JP Appln. 2010-174919.  
(Continued)

*Primary Examiner* — Gary Harris  
(74) *Attorney, Agent, or Firm* — Fitch, Even, Tabin & Flannery LLP

(57) ABSTRACT

Provided is a packaging material for electrochemical cells which has an identification mark that can be recognized from the outside and that is difficult to forge. The packaging material comprises a multilayer film which has a structure formed by laminating a base layer (11), an adhesive layer (13), a metal foil layer (12), an acid-modified polyolefin layer (14), and a heat-sealable layer (15) in this order, wherein the base layer (11) comprises both a oriented polyester film (11*b*) and a oriented nylon film (11*e*) with a printed layer (11*c*) provided on the surface of the oriented polyester film (11*b*) that faces the oriented nylon film (11*e*).

10 Claims, 3 Drawing Sheets

(51) Int. Cl.
  *H01G 9/08*    (2006.01)
  *B32B 7/12*    (2006.01)
  *B32B 15/08*   (2006.01)
  *B32B 27/08*   (2006.01)
  *B32B 27/34*   (2006.01)
  *B32B 27/36*   (2006.01)
  *H01G 11/78*   (2013.01)
  *H01M 10/0525* (2010.01)

(52) U.S. Cl.
  CPC ............... *B32B 27/34* (2013.01); *B32B 27/36* (2013.01); *H01G 9/08* (2013.01); *H01G 11/78* (2013.01); *H01M 2/0212* (2013.01); *H01M 2/0267* (2013.01); *H01M 2/0275* (2013.01); *H01M 2/0287* (2013.01); *B32B 2439/00* (2013.01); *B32B 2457/00* (2013.01); *H01M 10/0525* (2013.01); *Y02E 60/13* (2013.01)
  USPC ............ 429/185; 429/122; 429/163; 429/175

(56) References Cited

U.S. PATENT DOCUMENTS

| | | | |
|---|---|---|---|
| 7,084,616 | B1 | 8/2006 | Jenau et al. |
| 2003/0180609 | A1* | 9/2003 | Yamashita et al. ............ 429/185 |
| 2004/0029001 | A1* | 2/2004 | Yamazaki et al. ............ 429/176 |
| 2005/0136324 | A1 | 6/2005 | Yamada et al. |
| 2008/0241663 | A1* | 10/2008 | Yamashita et al. ............ 429/122 |
| 2010/0040942 | A1* | 2/2010 | Hatta et al. ............ 429/163 |
| 2011/0274922 | A1 | 11/2011 | Yasue et al. |

FOREIGN PATENT DOCUMENTS

| | | | | |
|---|---|---|---|---|
| JP | H04-127413 | A1 | 4/1992 | |
| JP | H06-99563 | A1 | 4/1994 | |
| JP | H08-81569 | A | 3/1996 | |
| JP | H10-208708 | A | 8/1998 | |
| JP | 2000-173559 | A | 6/2000 | |
| JP | 2001-260275 | A1 | 9/2001 | |
| JP | 2001260275 | A * | 9/2001 | ............ B32B 15/08 |
| JP | 2002-056824 | A | 2/2002 | |
| JP | 2002-292784 | A1 | 10/2002 | |
| JP | 2005-108747 | A | 4/2005 | |
| JP | 2005-166650 | A | 6/2005 | |
| JP | 2005-216707 | A1 | 8/2005 | |
| JP | 2005-297448 | A | 10/2005 | |
| JP | 2006-049054 | A | 2/2006 | |
| JP | 2007-083525 | A | 4/2007 | |
| JP | 2007-134304 | A | 5/2007 | |
| JP | 2007-161310 | A1 | 6/2007 | |
| JP | 2007-273398 | A1 | 10/2007 | |
| JP | 2008-105712 | A | 5/2008 | |
| JP | 2009-87628 | A1 | 4/2009 | |
| JP | 2009-087749 | A | 4/2009 | |
| JP | 2010-137563 | A | 6/2010 | |
| WO | 2007/072736 | A1 | 6/2007 | |

OTHER PUBLICATIONS

International Search Report dated Oct. 12, 2010 issued in International Application No. PCT/JP2010/063260.
Japanese Office Action dated Mar. 5, 2012 corresponding with JP Application 2010-174919.
R2 document (Chinese and partial English Translation) dated circa 2004, cited by Chinese Patent Office.

* cited by examiner

ELECTROCHEMICAL CELL PACKAGING MATERIAL

CROSS-REFERENCE TO RELATED APPLICATIONS

This application is the U.S. National Phase of International Application PCT/JP2010/063260, filed Aug. 5, 2010, and claims the benefit of foreign priority from Japanese Patent Application 2009-184850, filed Aug. 7, 2009 and Japanese Patent Application 2010-170323, filed Jul. 29, 2010, the entire disclosures of which applications are hereby incorporated herein by reference.

TECHNICAL FIELD

The present invention relates to an electrochemical cell packaging material which has an identification mark that can be recognized from the outside and that is difficult to forge.

BACKGROUND ART

An electrochemical cell packaging material composed of a multilayer film has recently been used as an exterior body for electrochemical cells such as lithium ion batteries, lithium polymer batteries, and fuel cells, or liquid capacitors, solid capacitors, and double-layer capacitors which include liquid, solid ceramic, organic, or other dielectrics, as described in Patent Citation 1, for example.

FIG. 4 is a sectional view showing the layer configuration of the conventional electrochemical cell packaging material, and as shown in FIG. 4, the conventional electrochemical cell packaging material 110 is composed of at least a base layer 111, a metal foil layer 112, and a heat-sealable layer 115, wherein the base layer 111 and the metal foil layer 112 are bonded via an adhesive layer 113, and the heat-sealable layer 115 and the metal foil layer 112 are bonded via an acid-modified polyolefin layer 114.

FIG. 5A is an exploded perspective view showing a lithium ion battery that uses a conventional embossed-type exterior body, and FIG. 5B is a perspective view showing a lithium ion battery that uses the conventional embossed-type exterior body. As shown in FIGS. 5A and 5B, a lithium ion battery 121 is fabricated by placing a lithium ion battery body 122 in a tray 120a having a concave part formed by cold pressing the electrochemical cell packaging material 110 shown in FIG. 3 and blocking the open part of the tray 120a with a sheet 120b in a cold press forming step, and overlaying the tray 120a with the heat-sealable layer 115 of the sheet 120b and heat-sealing the edge thereof in a sealing step.

In a lithium ion battery 121 fabricated in this manner, in the final battery manufacturing step, a label indicating product information and the like is affixed to the surface of an exterior body 120, or product information and the like is printed by an inkjet directly on the surface of the exterior body 120 instead of using a label.

However, in a case in which a counterfeit lithium ion battery or electrochemical cell packaging material from a manufacturer other than the authorized manufacturer bears the same identification mark as that of an authorized manufacturer, it is difficult to distinguish between a genuine product and a counterfeit product.

LIST OF CITATIONS

Patent Literature

Patent Citation 1: Japanese Laid-open Patent Publication No. 2007-273398

SUMMARY OF INVENTION

Technical Problem

In order to overcome this problem, methods have been proposed for using a hologram label in the identification mark to distinguish between a genuine product and a counterfeit product. However, hologram labels can raise the cost of the manufactured product, and there is also a risk that a hologram label may be forged.

In view of the foregoing problems, an object of the present invention is to provide an electrochemical cell packaging material which has an identification mark that can be recognized from the outside and that is difficult to forge.

Solution to Problem

The present invention for achieving the abovementioned objects is an electrochemical cell packaging material for housing an electrochemical cell body, the electrochemical cell body including a positive electrode comprising a positive-electrode active material and a positive-electrode collector, a negative electrode comprising a negative-electrode active material and a negative-electrode collector, and an electrolyte filled between the positive electrode and the negative electrode; and sealing the electrochemical cell body by heat-sealing of a peripheral edge part of the electrochemical cell packaging material; the electrochemical cell packaging material characterized in that the electrochemical cell packaging material is a multilayer film having a structure formed by laminating at least a base layer, an adhesive layer, a metal foil layer, and a heat-sealable layer in this order; and any of the base layer, the adhesive layer, and the metal foil layer includes an identification mark.

According to this configuration, since the identification mark is included in any of the base layer, the adhesive layer, and the metal foil layer which constitute the electrochemical cell packaging material, the electrochemical cell packaging material as such serves as an identifier, and authenticity can easily be determined even in a case in which printing is applied or a label is affixed as a forged identification mark on the electrochemical cell packaging material. Any of the base layer, the adhesive layer, and the metal foil layer of the electrochemical cell packaging material includes the identification mark, and there is no need to provide an additional layer for the identification mark. There is therefore no reduction in adhesive strength between the base layer and the metal foil layer, and a predetermined adhesive strength can be maintained. Consequently, in a case in which the electrochemical cell packaging material is molded by press molding or the like, the base layer and the metal foil layer can be prevented from peeling apart to form bubbles or wrinkles due to heat applied in a sealing step after molding.

The electrochemical cell packaging material of the present invention configured as described above is characterized in that the base layer has a oriented polyester film and a oriented nylon film; and the identification mark is included between the oriented polyester film and the oriented nylon film.

According to this configuration, the identification mark is protected by the oriented polyester film, and the printed layer cannot be forged or worked from the outside of the electrochemical cell packaging material. By forming the identification mark between the oriented polyester film and the oriented nylon film, there is no reduction in adhesive strength between the oriented nylon film layer and the metal foil layer. By forming the oriented polyester film as the outermost layer, in the case that electrolytic solution or a solvent adheres to the surface of the electrochemical cell packaging material, the oriented polyester film protects the oriented nylon film, and whitening or damage to the electrochemical cell packaging material can be prevented.

The electrochemical cell packaging material of the present invention configured as described above is characterized in that the identification mark comprises a printed layer provided on a surface of the oriented polyester film that faces the oriented nylon film.

According to this configuration, the identification mark can easily be formed between the oriented polyester film and the oriented nylon film by printing the identification mark on the surface of the oriented polyester film and bonding together the oriented polyester film and the oriented nylon film. Printing also enables a complex design to be formed on the surface of the oriented polyester film, and an identification mark can be formed that is difficult to forge.

The electrochemical cell packaging material of the present invention configured as described above is characterized in that the identification mark comprises a colored bonded layer interposed between the oriented polyester film and the oriented nylon film.

According to this configuration, a colored layer can be formed between the oriented polyester film and the oriented nylon film, and the electrochemical cell packaging material can be identified by the imparted color. The authenticity of a product can therefore be easily determined by a color difference that can be recognized from the outside of the electrochemical cell packaging material, even in a case in which printing is applied or a label is affixed as a forged identification mark on the electrochemical cell packaging material.

The electrochemical cell packaging material of the present invention configured as described above is characterized in that the identification mark comprises the adhesive layer, the adhesive layer being colored.

According to this configuration, the electrochemical cell packaging material can be identified by the color of the colored adhesive layer. The authenticity of a product can therefore be easily determined by a color difference that can be recognized from the outside of the electrochemical cell packaging material, even in a case in which printing is applied or a label is affixed as a forged identification mark on the electrochemical cell packaging material. Since color is imparted to the adhesive layer as such for bonding the base layer and the metal foil layer, there is no reduction in adhesive strength between the base layer and the metal foil layer, and a predetermined adhesive strength can be maintained.

The electrochemical cell packaging material of the present invention configured as described above is characterized in that the base layer comprises a oriented nylon film; and the identification mark comprises the oriented nylon film, the oriented nylon film being colored.

According to this configuration, the electrochemical cell packaging material can be identified by the color of the colored oriented nylon film. Since the base layer as such is colored, there is no reduction in adhesive strength between the base layer and the metal foil layer, and a predetermined adhesive strength can be maintained.

The electrochemical cell packaging material of the present invention configured as described above is characterized in that the identification mark comprises a unevenness applied to a metal foil surface that constitutes the metal foil layer.

According to this configuration, the electrochemical cell packaging material can be identified by the unevenness applied to the metal foil surface. The authenticity of a product can therefore be easily determined by a unevenness that can be recognized from the outside of the electrochemical cell packaging material. Since a metal foil layer provided with a unevenness is used, and the metal foil layer to which the unevenness is applied is laminated with the base layer via the adhesive layer, there is no reduction in adhesive strength between the base layer and the metal foil layer, and a predetermined adhesive strength can be maintained.

The electrochemical cell packaging material of the present invention configured as described above is characterized in that the identification mark is formed by including a pearl pigment in a constituent resin.

According to this configuration, the electrochemical cell packaging material is colored by a pearl pigment, and the electrochemical cell packaging material can be identified by this color.

The electrochemical cell packaging material of the present invention configured as described above is characterized in that the identification mark is formed by including a fluorescent pigment in a constituent resin.

According to this configuration, the electrochemical cell packaging material is colored by the color development of the fluorescent pigment, and the electrochemical cell packaging material can be identified by this color.

The electrochemical cell packaging material of the present invention configured as described above is characterized in that a matte varnish layer is formed on the base layer.

According to this configuration, a matting effect can be produced on the surface of the base layer by forming a matte varnish layer on the base layer. A design can thereby be formed by the base layer as a whole, together with the identification mark formed on the inside with respect to the base layer. The smoothness of the base layer surface is also increased by the matte varnish layer, and molding defects in an embossed molding step can be reduced. The smoothness can be adjusted at this time by adjusting the amount of lubricant added to the matte varnish, and the matting effect can be adjusted by adjusting the particle diameter and added amount of the matte material.

The electrochemical cell packaging material of the present invention configured as described above is characterized in that a matte treatment is applied on the base layer to impart a predetermined surface roughness to a surface thereof.

According to this configuration, a matting effect can be produced on the surface of the base layer by applying a matte treatment on the base layer to impart a predetermined surface roughness thereto. A design can thereby be formed by the base layer as a whole, together with the identification mark formed on the inside with respect to the base layer. With a matte film to which a matte treatment is applied by working the surface thereof, the matting effect is not readily reduced by pressure or abrasion of the surface of the base layer during press molding. The matting effect is also not readily reduced even in the case of adhesion of the electrochemical cell solvent.

DESCRIPTION OF EMBODIMENTS

First Embodiment

Figure 1:
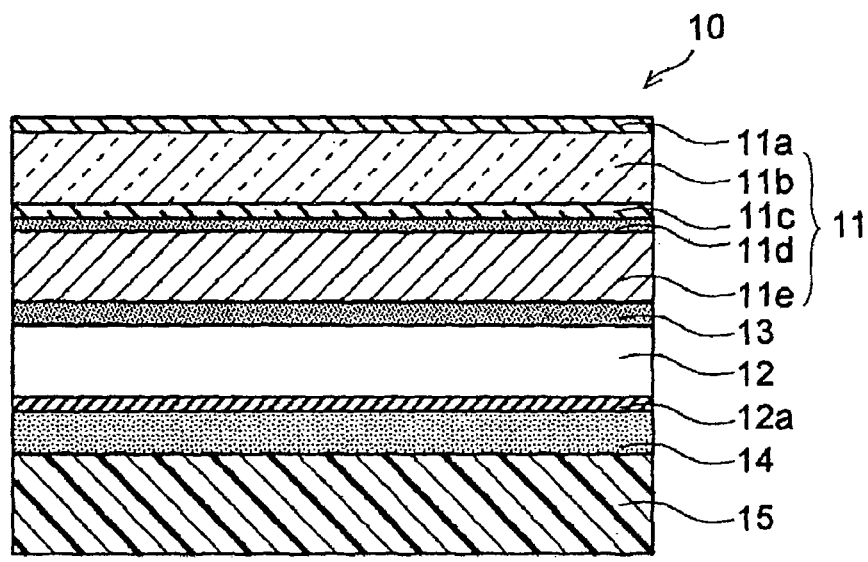
FIG. 1 is a sectional view showing the layer configuration of the electrochemical cell packaging material according to a first embodiment.
Figure 4:
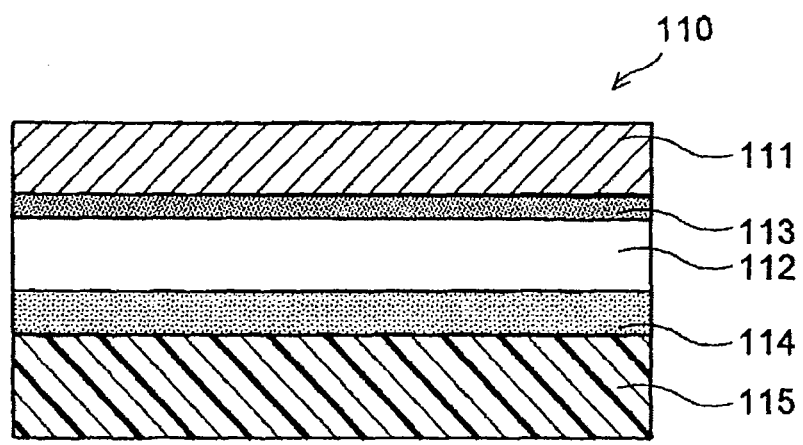
FIG. 4 is a sectional view showing the layer configuration of the conventional electrochemical cell packaging material.
Figure 5A:
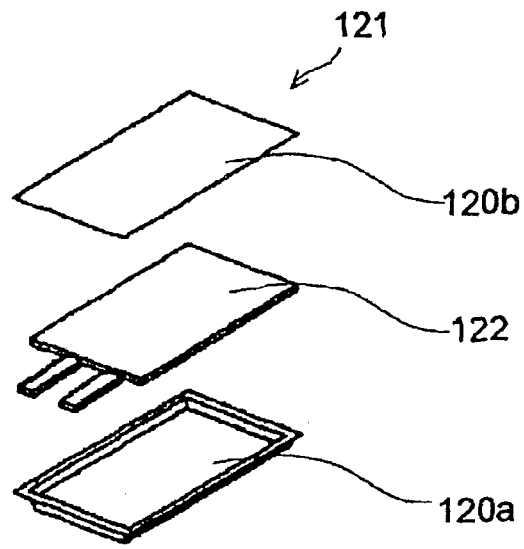
FIG. 5A is an exploded perspective view showing a lithium ion battery that uses a conventional embossed-type exterior body.
Figure 5B:
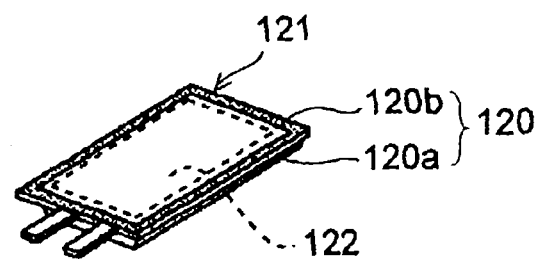
FIG. 5B is a perspective view showing a lithium ion battery that uses the conventional embossed-type exterior body.

The electrochemical cell packaging material 10 according to a first embodiment of the present invention will be described in detail with reference to the drawings. Portions that are the same as in the conventional examples shown in FIGS. 4 and 5 are not described. FIG. 1 is a sectional view showing the layer configuration of the electrochemical cell packaging material according to the first embodiment of the present invention, and as shown in FIG. 1, the electrochemical cell packaging material 10 of the present invention is configured such that a metal foil layer 12 is provided between a base layer 11 as the outermost layer and a heat-sealable layer 15 as the innermost layer, and the heat-sealable layer 15 and the metal foil layer 12 are bonded via an acid-modified polyolefin layer 14. The base layer 11 and the metal foil layer 12 are bonded via an adhesive layer 13. At this time, a chemical conversion layer 12a is provided on a surface of the metal foil layer 12 that faces the acid-modified polyolefin layer 14. The base layer 11 is composed of a matte varnish layer 11a, a oriented polyester film 11b, a printed layer 11c, a bonded layer 11d, and a oriented nylon film 11e. The technical scope of the present invention includes cases in which the electrochemical cell packaging material 10 of the present invention includes the abovementioned layers, as well as cases in which different layers are interposed between the layers described above.

The printed layer 11c and the matte varnish layer 11a are formed by printing and applying an ink material or matte varnish material to both sides of the oriented polyester film 11b. Through this configuration, the printed layer 11c has the appearance of being decorated with a matte finish by the matte varnish layer 11a when the electrochemical cell packaging material 10 is viewed from the base layer 11 side. The smoothness of the surface of the base layer 11 is also increased by the matte varnish layer 11a, and molding defects in an embossed molding step can be reduced. The smoothness of the surface of the base layer 11 can be adjusted by adjusting the amount of lubricant added to the matte varnish material, and the matte look (matting effect) of the matte varnish layer 11a can be adjusted by adjusting the particle diameter and added amount of the matte material that is included in the matte varnish material.

Since the printed layer 11c is formed on the surface of the oriented polyester film 11b that faces the oriented nylon film 11e, the printed layer 11c is protected from the outside by the oriented polyester film 11b, and the printed layer 11c cannot be forged or altered from the outside of the electrochemical cell packaging material 10. The printed layer 11c is also not abraded when the surface of the electrochemical cell packaging material 10 is abraded. Since the printed layer 11c is formed between the oriented polyester film 11b and the oriented nylon film 11e, there is no reduction in adhesive strength between the oriented nylon film 11e and the metal foil layer 12. The base layer 11 and the metal foil layer 12 can therefore be prevented from peeling apart to form bubbles or wrinkles during press molding of the electrochemical cell packaging material 10. By forming the oriented polyester film 11b as the outermost layer, in the case that electrolytic solution or a solvent adheres to the surface of the electrochemical cell packaging material 10, the oriented polyester film 11b protects the oriented nylon film 11e, and whitening or damage to the electrochemical cell packaging material 10 can be prevented.

In plan view of the oriented polyester film 11b, when the printed layer 11c is broadly formed, the entire electrochemical cell packaging material 10 is colored, and when the printed layer 11c is formed in localized fashion, an identification mark or design that is difficult to forge can be imparted to the printed layer 11c The printed layer 11c can be formed using an ink material by gravure printing, silkscreen printing, offset printing, or another publicly known printing method.

By using a oriented polyester film whose film surface is provided in advance with a predetermined surface roughness as the oriented polyester film 11b, the surface of the base layer 11 can be decorated with a matte finish without forming a matte varnish layer 11a. At this time, the matte look (matting effect) is less prone to be reduced by pressure or abrasion during press molding than that of the matte varnish layer 11a. The matte look (matting effect) is also not prone to be reduced by adhesion of the electrochemical cell solvent.

The layers constituting the electrochemical cell packaging material 10 of the present invention shown in FIG. 1 will next be specifically described.

A matte varnish in which an appropriate amount of silica-based, kaolin-based, or another inorganic material-based matting agent is added to an alkyd-based synthetic resin or a cellulose-based, polyamide-based, vinyl acetate-based, modified polyolefin-based, rubber-based, acrylic-based, urethane-based, or other olefin-based resin, for example, may be used as the matte varnish layer 11a. Alternatively, a matte varnish may be used in which an appropriate amount of a wax and a silica-based, kaolin-based, or other inorganic material-based matting agent is added to an alkyd-based synthetic resin or the aforementioned olefin-based resin. The method for forming the matte varnish layer is not particularly limited, and an offset printing scheme, a gravure printing scheme, a flexo printing scheme, a silkscreen printing scheme, a roll coating scheme, a reverse coating scheme, or the like, for example, may be used as appropriate.

A polyester resin having ductility to withstand press molding may be used as the oriented polyester film 11b, and specific polyester resins include polyethylene terephthalate, polybutylene terephthalate, polyethylene naphthalate, polybutylene naphthalate, copolyester, polycarbonate, and the like.

The ink material used in the printed layer 11c may be composed of a binder, a pigment, dye, or other colorant, and various additives added thereto as appropriate, the same as a common ink. A chromatic color pigment or an inorganic-based color pigment may be used as the colorant, and examples of chromatic color pigments include azo-based pigments, phthalocyanine-based pigments, condensed polycyclic pigments, and the like. Watchung red, carmine 6C, and other soluble pigments, and monoazo yellow, disazo yellow, pyrazolone orange, red, permanent red, and other insoluble azo pigments can be cited as azo-based pigments. Copper phthalocyanine pigment can be cited as a phthalocyanine-based pigment. Non-metallic phthalocyanine pigments include blue and green-based pigments, and dioxazine violet, quinacridone violet, and the like can be cited as condensed polycyclic pigments. Titanium oxide, carbon black, and the like, for example, can be used as inorganic-based color pigments.

An adhesive or a polyolefin resin can be used as the bonded layer 11d, and specific examples of adhesives may include polyvinyl acetate-based adhesives, ethyl and butyl acrylates, 2-ethylhexyl esters, and other homopolymers, or polyacrylic acid ester-based adhesives composed of copolymers or the like of the above compounds with methyl methacrylate, acrylonitrile, styrene, or the like; cyanoacrylate-based adhesives; ethylene copolymer-based adhesives composed of ethylene and vinyl acetate, ethyl acrylate, acrylic acid, methacrylic acid, and other monomers; cellulose-based adhesives; polyester-based adhesives; polyamide-based adhesives; polyimide-based adhesives; amino resin-based adhesives composed of urea resin, melamine resin, or the like; phenol resin-based adhesives; epoxy-based adhesives; polyurethane-based adhesives; reactive (meth)acrylic-based adhesives; rubber-based adhesives composed of chloroprene rubber, nitrile rubber, styrene-butadiene rubber, and the like; silicone-based adhesives; inorganic-based adhesives composed of alkali metal silicates, low-melting glass, and the like; and other adhesives. The oriented polyester film 11b and the oriented nylon film 11e can be bonded together by extruding a molten polyolefin resin therebetween, and specific examples of polyolefin resins include polyethylene, polypropylene, and other heat-bondable resins.

The oriented nylon film 11e may be a polyamide resin, specifically, nylon 6, nylon 6,6, a copolymer of nylon 6 and nylon 6,6, nylon 6,10, poly meta-xylylene adipamide (MXD6), or the like.

The adhesive layer 13 is a layer in which the oriented nylon film 11e and the metal foil layer 12 are bonded by a dry lamination method, and the same adhesive as that of the bonded layer 11d described above may be used.

The metal foil layer 12 will next be described. The metal foil layer 12 is a layer for preventing water vapor from penetrating into a lithium ion battery from the outside, and the metal foil layer may be a film or the like on which aluminum, nickel, or other metal or an inorganic compound, e.g., silicon oxide, alumina, or the like, is vapor-deposited to a thickness of 15 μm or greater in order to stabilize pinholing and processability (pouch formation, cold press moldability) of the metal foil layer unit and impart anti-pinholing properties. However, the metal foil that constitutes the metal foil layer 12 is preferably aluminum having a thickness of 20 to 100 μm.

In a case in which the occurrence of pinholing is reduced, and the exterior body of the lithium ion battery is the embossed type, the aluminum used as the metal foil layer 12 preferably has an iron content of 0.3 to 9.0 wt %, preferably 0.7 to 2.0 wt %, in order to eliminate cracking and other defects in cold press molding.

The aluminum is thereby endowed with good ductility relative to aluminum that contains no iron, pinholing due to folding is minimized in the exterior body, and side walls can easily be formed during cold press molding of the packaging material. In the case that the iron content is less than 0.3 wt %, pinholing is not prevented, and improved cold press moldability and other effects are not obtained, and in the case that the iron content of the aluminum is greater than 9.0 wt %, the flexibility of the aluminum is inhibited, and the ability to form a bag with the packaging material is reduced.

The flexibility and firmness/hardness of aluminum manufactured by cold rolling vary according to the annealing (so-called tempering process) conditions, but a partially or completely annealed aluminum that tends to be flexible is preferred in the present invention over a hard-treated product that is not annealed.

Specifically, the annealing conditions may be selected as appropriate according to processability (pouch formation, cold press molding). For example, in order to prevent wrinkling or pinholing during cold press molding, a flexible aluminum may be used that is annealed in accordance with the degree of molding.

The strength of adhesion to the adhesive can also be enhanced by applying a chemical conversion treatment to the front and back surfaces of the aluminum of the metal foil layer 12 to form the chemical conversion layer 12a.

The chemical conversion layer 12a will next be described. As shown in FIG. 1, the chemical conversion layer 12a is formed on at least the surface of the metal foil layer 12 that faces the heat-sealable layer 15. The chemical conversion layer 12a is capable of stably bonding the acid-modified polyolefin layer 14 and the metal foil layer 12 and preventing delamination of the metal foil layer 12 and the heat-sealable layer 15. The chemical conversion layer 12a also serves to prevent corrosion of the metal foil layer 12.

Specifically, by forming an antioxidant coating of a phosphate, chromate, fluoride, triazine thiol compound, or the like, it is possible to prevent delamination between the metal foil layer 12 and the heat-sealable layer 15 during embossed molding, to prevent dissolution and corrosion of the aluminum surface, particularly dissolution and corrosion of the aluminum oxide that is present on the surface of the aluminum, due to hydrogen fluoride that occurs when the electrolyte of the lithium ion battery reacts with moisture, and to enhance the adhesion of the aluminum surface.

The chemical conversion layer 12a is formed on the surface of the metal foil layer 12 by a chromic acid chromate treatment, a phosphoric acid chromate treatment, an application-type chromate treatment, or other chromium-based chemical conversion treatment, or a zirconium, titanium, zinc phosphate, or other non-chromium-based (application-type) chemical conversion treatment or the like, but an application-type chemical conversion treatment, particularly a treatment with a treatment fluid containing an aminated phenol polymer, a trivalent chromium compound, and a phosphorus compound, is most preferred in terms of strong adhesion to fluorine-based resins, and low processing cost due to the ability to perform continuous processing and no need for a rinsing step.

The heat-sealable layer 15 will next be described. The innermost heat-sealable layer 15 is held and heat-bonded in a state in which metal terminals of the lithium ion battery body 122 protrude to the outside. At this time, the type of propylene that constitutes the heat-sealable layer 15 varies according to whether an adhesive film for sealing the metal terminals, which is adhesive to metal, is present between the heat-sealable layer 15 and the metal terminals. In the case that the adhesive film for sealing the metal terminals is present, a film composed of a single propylene-type resin or a mixture thereof may be used, but in the case that there is no adhesive film for sealing the metal terminals, a film must be used that is composed of an acid-modified olefin resin that is graft modified by an unsaturated carboxylic acid.

Polypropylene is suitable for use as the heat-sealable layer 15, but a film may also be used that is composed of one or more layers of linear low-density polyethylene or mid-density polyethylene, or one or more layers of a blended resin of linear low-density polyethylene and mid-density polyethylene. Polypropylene may be classified into random propylene, homopropylene, block propylene, and other types.

Low-crystallinity ethylene-butene copolymer, low-crystallinity propylene-butene copolymer, terpolymers composed of three-component copolymers of ethylene, butene, and propylene, silica, zeolite, acrylic resin beads, and other anti-blocking agents (AB agents), fatty acid amide-type slip agents, and the like may be added to the abovementioned types of polypropylenes, i.e., random polypropylene, homopolypropylene, and block polypropylene.

The heat-sealable layer 15 according to the present invention may also be endowed with a multilayer structure by combining the abovementioned types of polypropylenes at an appropriate time.

The acid-modified polyolefin layer 14 will next be described. The acid-modified polyolefin layer 14 is a layer provided for bonding the metal foil layer 12 and the heat-sealable layer 15, and although the material thereof must be appropriately selected for use according to the type of resin used in the heat-sealable layer 15, an acid-modified polyolefin resin may be used, and the acid-modified polyolefin layer 14 is a polyolefin resin that is graft modified by an unsaturated carboxylic acid, a copolymer of ethylene or propylene with acrylic acid or methacrylic acid, or a metal cross-linked polyolefin resin or the like, and 5% or more of a butene component, ethylene-propylene-butene copolymer, non-crystalline ethylene-propylene copolymer, propylene-α-olefin copolymer, or the like may also be added thereto.

Using an acid-modified polypropylene as the acid-modified polyolefin layer 14 makes it possible to provide an electrochemical cell packaging material 10 having even better adhesive strength and resistance to contents.

In the case that an acid-modified polypropylene is used, (1) a homo-type having a Vicat softening point of 115° C. or higher and a melting point of 150° C. or higher, (2) a copolymer (random copolymer type) of ethylene and propylene having a Vicat softening point of 105° C. or higher and a melting point of 130° C. or higher, or (3) a simple or blended substance which is acid-modified using an unsaturated carboxylic acid, having a melting point of 110° C. or higher may be used.

Figure 2:
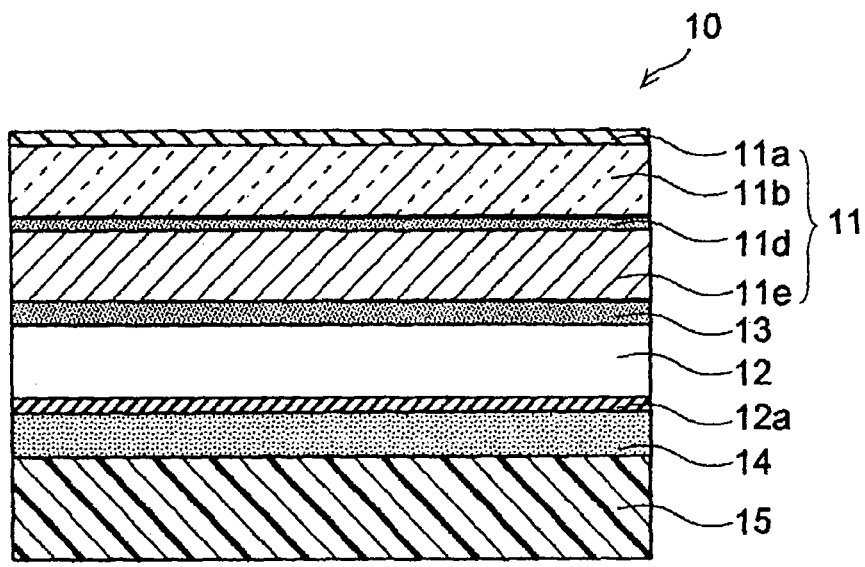
FIG. 2 is a sectional view showing the layer configuration of the electrochemical cell packaging material according to a modification of the first embodiment.

A modification of the first embodiment will next be described. FIG. 2 is a sectional view showing the layer configuration of the electrochemical cell packaging material according to a modification of the first embodiment, and portions thereof that are the same as the first embodiment are referred to by the same reference symbols. As shown in FIG. 2, by coloring the bonded layer 11d with titanium oxide or another color pigment instead of the printed layer 11c, an identification mark can be formed in the bonded layer 11d. According to this configuration, the bonded layer 11d is colored white by the titanium oxide, and the electrochemical cell packaging material 10 is identified by the white color viewed from the side of the transparent oriented polyester film 11b. The authenticity of a product can therefore be easily determined by a color difference that can be recognized from the outside of the electrochemical cell packaging material 10, even in a case in which printing is applied or a label is affixed as a forged identification mark on the surface of the base layer 11 of the electrochemical cell packaging material 10.

The bonded layer 11d is preferably composed of an adhesive to which titanium oxide or another color pigment is added to give a solids content of 5 wt % or greater and 30 wt % or less, preferably 10 wt % or greater and 25 wt % or less. The imparted color is thin and difficult to identify when the added quantity of the color pigment is less than 5 wt %. The adhesive strength decreases when the added quantity of the color pigment exceeds 30 wt %. Shading of the imparted color can be expressed by adjusting the added quantity of the color pigment, and the electrochemical cell packaging material 10 can also be identified by the shading of the color. The adhesive used may be an adhesive cited above as a specific example of the bonded layer 11d. The technical scope of the present invention also encompasses an embodiment in which polyethylene or another polyolefin resin blended with a color pigment is extruded in a molten state and laminated with the oriented polyester film 11b and the oriented nylon film 11e.

A chromatic color pigment or an inorganic-based color pigment may be used as the color pigment, and examples of chromatic color pigments include azo-based pigments, phthalocyanine-based pigments, condensed polycyclic pigments, and the like. Watchung red, carmine 6C, and other soluble pigments, and monoazo yellow, disazo yellow, pyrazolone orange, red, permanent red, and other insoluble azo pigments can be cited as azo-based pigments. Copper phthalocyanine pigment can be cited as a phthalocyanine-based pigment. Non-metallic phthalocyanine pigments include blue and green-based pigments, and dioxazine violet, quinacridone violet, and the like can be cited as condensed polycyclic pigments. Titanium oxide, carbon black, and the like, for example, can be used as inorganic-based color pigments.

The bonded layer 11d can be colored by titanium oxide or another color pigment, as well as by a pearl pigment or fluorescent pigment. Traditionally, pearl powder or powder made from the inside portion of a shell was used as pearl pigment, but fine flakes (chips) coated on the outside with a metal oxide or metal oxide mixture are now used. The fine flakes may be mica, talc, kaolin, or bismuth oxychloride, or glass flakes, $SiO_2$ flakes, synthetic ceramic flakes, or the like, and examples of metal oxides for coating the outside of the fine flakes include $TiO_2$, $Fe_2O_3$, $SnO_2$, $Cr_2O_3$, and ZnO. Among combinations of these substances, mica, glass flakes, or $SiO_2$ flakes coated with $TiO_2$ and/or $Fe_2O_3$ are preferred. Fluorescent pigments are phosphors, i.e., substances which are generally luminescent, and include both inorganic fluorescent pigments and organic fluorescent pigments. Pigments primarily composed of crystals of oxides, sulfides, silicates, phosphates, tungstates, and the like of Ca, Ba, Mg, Zn, Cd and the like which are obtained by sintering after adding Mn, Zn, Ag, Cu, Sb, Pb or another metal element or a lanthanoid or rare earth element as an activating agent can be used as inorganic fluorescent pigments. Examples of preferred phosphors include ZnO:Zn, $Br_5(PO_4)_3Cl$:Eu, $Zn_2GeO_4$:Mn, $Y_2O_3$:Eu, Y(P,V)$O_4$:Eu, $Y_2O_2Si$:Eu, $Zn_2GeO_4$:Mn, and the like, and diaminostilbenedisulfonic acid derivatives, imidazole derivatives, coumarin derivatives, triazoles, carbazoles, pyridines, naphthalic acid, imidazolones, and other pigments, anthracines and other compounds which have a benzene ring, and the like can be used as organic fluorescent pigments.

Second Embodiment

Figure 3:
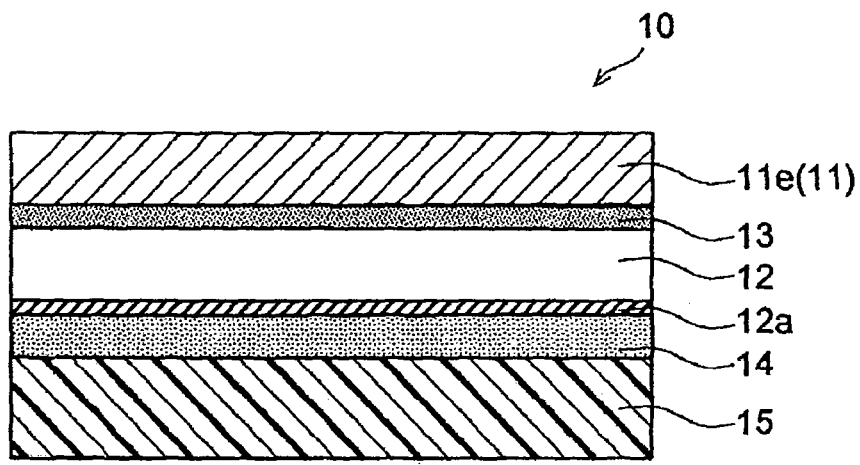
FIG. 3 is a sectional view showing the layer configuration of the electrochemical cell packaging material according to a second embodiment.

The electrochemical cell packaging material according to a second embodiment of the present invention is described below with reference to the drawings. The same reference symbols are used to refer to portions of the second embodiment that are the same as the first embodiment, and no description thereof is given. FIG. 3 is a sectional view showing the layer configuration of the electrochemical cell packaging material of the present invention, and as shown in FIG. 3, the base layer 11 of the electrochemical cell packaging material 10 of the second embodiment is composed of the oriented nylon film 11e, and the oriented nylon film 11e and the metal foil layer 12 are bonded via the adhesive layer 13.

Here, the adhesive layer 13 is composed of an adhesive which contains titanium oxide or another color pigment, and the adhesive layer 13 is colored white. The electrochemical cell packaging material 10 is thereby identified by the white color viewed from the side of the transparent oriented nylon film 11e. Since the adhesive layer 13 as such for bonding the oriented nylon film 11e and the metal foil layer 12 includes a color pigment, there is substantially no reduction in adhesive strength between the oriented nylon film 11e and the metal foil layer 12. Consequently, in a case in which the electrochemical cell packaging material 10 is molded by press molding or the like, the oriented nylon film 11e and the metal foil layer 12 can be prevented from peeling apart to form bubbles or wrinkles due to heat applied in a sealing step after molding.

The adhesive layer 13 is preferably composed of an adhesive to which titanium oxide or another color pigment is added to give a solids content of 5 wt % or greater and 30 wt % or less, preferably 10 wt % or greater and 25 wt % or less. The imparted color is thin and difficult to identify when the added quantity of the color pigment is less than 5 wt %. When the added quantity of the color pigment exceeds 30 wt %, the adhesive strength between the oriented nylon film 11e and the metal foil layer 12 decreases, the heat applied in the sealing step after molding causes the oriented nylon film 11e to shrink so as to return to the original shape thereof, and the oriented nylon film 11e and metal foil layer 12 to peel apart and form bubbles or wrinkles. Shading of the imparted color can be expressed by adjusting the added quantity of the color pigment. The electrochemical cell packaging material 10 can thereby also be identified by the shading of the color.

The color pigment may be titanium oxide or another color pigment cited in the first embodiment, or the adhesive layer 13 may be colored using a pearl pigment or fluorescent pigment cited in the first embodiment. An adhesive cited for use in the bonded layer 11d of the first embodiment may also be used as the adhesive for forming the adhesive layer 13.

The same effects can be obtained in the adhesive layer 13 even when an adhesive that is not colored is used instead of an adhesive that contains titanium oxide or another color pigment, and the oriented nylon film 11e is colored. In other words, the electrochemical cell packaging material 10 can be identified by the color of the oriented nylon film 11e which is colored by inclusion of a color pigment, and by coloring the base layer 11 as such, a predetermined adhesive strength can be maintained without reducing the adhesive strength of the base layer 11 and the metal foil layer 12. Using a oriented nylon film 11e whose surface is matte treated also increases the smoothness of the surface of the electrochemical cell packaging material 10, and molding defects in a cold press molding step can be reduced. The same effects can be obtained when the abovementioned matte varnish layer 11a is formed on the oriented nylon film 11e instead of applying a matte treatment to the oriented nylon film 11e.

The same effects can also be obtained in the metal foil layer 12 through use of a metal foil subjected to a matte treatment having a fine unevenness on the surface thereof, or a metal foil having localized unevenness, instead of using a colored adhesive layer 13 or oriented nylon film 11e. In other words, the electrochemical cell packaging material 10 can be identified by the unevenness provided to the metal foil surface that constitutes the metal foil layer 12, and the authenticity of a product can be easily determined by a unevenness that can be recognized from the outside of the electrochemical cell packaging material 10 even in a case in which printing is applied or a label is affixed as a forged identification mark on the electrochemical cell packaging material 10. Since a metal foil provided with a fine unevenness is used as the metal foil that constitutes the metal foil layer 12, there is no reduction in adhesive strength between the base layer 11 and the metal foil layer 12.

The present invention is not limited to the embodiments described above, various modifications thereof are possible, and the technical scope of the present invention also encompasses embodiments obtained by appropriately combining the technical means disclosed in each of the different embodiments. For example, an identification mark may be formed by a combination of any or all of the matte varnish layer 11a, the printed layer 11c, the colored bonded layer 11d, the colored oriented nylon film 11e, the colored adhesive layer 13, and the metal foil layer 12 in which a unevenness is formed, or an identification mark may be formed from any one of the above constituent elements. Combining these constituent elements allows a complex design to be formed that is more difficult to forge.

In the embodiments, the acid-modified polyolefin layer 14 is provided between the metal foil layer 12 and the heat-sealable layer 15, but the technical scope of the present invention also encompasses embodiments in which the acid-modified polyolefin layer 14 is not provided. Specifically, the technical scope of the present invention encompasses embodiments in which an adhesive layer other than an acid-modified polyolefin resin is provided between the metal foil layer 12 and the heat-sealable layer 15, embodiments in which an acid-modified polyolefin resin is used in the heat-sealable layer 15, embodiments in which a chemically converted metal foil layer 12 and heat-sealable layer 15 are heat-laminated, and other embodiments.

Example 1

The operations and effects of the present invention are specifically described below using examples. Example 1 is an evaluation of the molding suitability and laminate strength of the electrochemical cell packaging material. In this experiment, electrochemical cell packaging materials fabricated using different amounts of color pigment added to the adhesive layer are compared in order to confirm the molding suitability and laminate strength of the electrochemical cell packaging material in the case that a color pigment is added to the adhesive layer that constitutes the electrochemical cell packaging material.

[Fabrication of Packaging Material Samples]

A chemical conversion treatment was applied on both sides of aluminum (thickness: 40 μm), a oriented nylon film (thickness: 25 μm) was affixed to one chemical-conversion-treated surface by a dry lamination method via a polyester-based adhesive so as to give a thickness of approximately 4 μm of the adhesive layer, an acid-modified polypropylene (thickness: 23 μm) was melt-extruded onto the other chemical-conversion-treated surface and a sealant film composed of a polypropylene film (thickness: 23 μm) was laminated thereon, and a electrochemical cell packaging material was obtained which was composed of a oriented nylon film, a polyester-based adhesive, aluminum treated on both sides with a chemical conversion treatment, an acid-modified polypropylene, and a polypropylene film in this order.

At this time, an aqueous solution composed of phenol resin, a chromium fluoride compound, and phosphoric acid was used as the treatment fluid in each chemical conversion treatment, which was applied by roll coating, and sintering was performed to give a coating temperature of 180° C. or higher. The amount of chromium applied was 10 mg/m$^2$ (dry weight).

Adhesives in which titanium oxide as the color pigment was added to a polyester-based adhesive to give a solids content of 0 wt %, 5 wt %, 10 wt %, 15 wt %, 20 wt %, 25 wt %, 30 wt %, 40 wt %, and 50 wt % were used, and the electrochemical cell packaging materials obtained were designated as Samples 1 through 9. Samples 2 through 9 were the electrochemical cell packaging material of the present invention.

In a packaging material obtained by the method described above, instead of adding a color pigment to the polyester-based adhesive, a printed layer (thickness: 2 μm) of urethane-based ink to which titanium oxide as a color pigment was added to give a solids content of 15 wt % was formed on one side of the oriented nylon film (thickness: 25 μm), and an electrochemical cell packaging material of a comparative example was obtained, composed of a oriented nylon film, a printed layer, a polyester-based adhesive, aluminum treated on both sides with a chemical conversion treatment, an acid-modified polypropylene, and a polypropylene film in this order.

[Evaluation of Moldability]

The electrochemical cell packaging materials of Samples 1 through 9 and the comparative example fabricated by the method described above were cut into 120×80 mm strips, and using a straight mold (male mold corner R: 2 mm, ridge line R: 1 mm) composed of a 55×32 mm rectangular positive mold and a negative mold having a 0.3 mm clearance with the positive mold, a strip was mounted on the negative mold so that the heat-sealable layer was positioned facing the positive mold, the strip was pressed at a pressure (contact pressure) of 0.16 MPa, and the electrochemical cell packaging materials of Samples 1 through 9 and the comparative example were cold press molded to a molding depth of 6 mm. The electrochemical cell packaging materials of Samples 1 through 9 and the comparative example were thereby each made into a molded container (tray) having a 55×32 mm rectangular concave part with a depth of 6 mm, and a flange part at the four peripheral edges of the concave part.

A strip having substantially the same size as the outer circumference of the tray was then separately prepared, the concave part was covered substantially even with the flange part, and two peripheral edges of the concave part were heat sealed at a width of 7 mm. Heat sealing at this time was performed using a hot plate coated on the top and bottom with a fluorine-based resin coating, using a sealing temperature of 190° C., a contact pressure of 1 MPa, and a sealing time of 3.0 seconds. The incidence of bubbles, wrinkles, or peeling apart at the intersections of the 7 mm-width heat seal was evaluated, as shown in Table 1. Table 1 also shows an evaluation of the apparent color due to the color pigment that was recognizable from the side of the oriented nylon film of the electrochemical cell packaging material.

[Evaluation by Measurement of Laminate Strength]

Each packaging material fabricated as described above was then cut into a 15 mm-wide strip, tension was applied between the aluminum and the base layer as the outermost layer of the laminated electrochemical cell packaging material at a speed of 50 mm/minute by a tensile tester (AGS-50D (trade name), manufactured by Shimadzu Seisakusho) to measure the laminate strength, and the measured value was designated as the electrolyte-resistant laminate strength. The units thereof are N/15 mm of width. Table 1 shows the laminate strength measured for the electrochemical cell packaging materials of Samples 1 through 9 and the comparative example.

TABLE 1

| | Color pigment (solid content %) | Laminate strength (N/15 mm) | Moldability | Color |
|---|---|---|---|---|
| Sample 1 | 0 | Break | ○ | — |
| Sample 2 | 5 | Break | ○ | Δ |
| Sample 3 | 10 | Break | ○ | ○ |
| Sample 4 | 15 | Break | ○ | ○ |
| Sample 5 | 20 | Break | ○ | ○ |
| Sample 6 | 25 | Break | ○ | ○ |
| Sample 7 | 30 | 8.0 | ○ | ○ |
| Sample 8 | 40 | 6.0 | X | ○ |
| Sample 9 | 50 | 4.0 | X | ○ |
| Comparative Example | — | 4.0 | X | ○ |

As shown in Table 1, it was apparent by comparing Samples 1 through 9 and the comparative example that good moldability was obtained in Samples 1 through 7. Specifically, wrinkling and interlayer peeling were observed (x) in cases in which the color pigment was added in the amount of 40% or more to the adhesive, such as in Samples 8 and 9, and in the case that a printed layer composed of ink was provided, as in the comparative example. On the other hand, no wrinkling or interlayer peeling was observed in Samples 1 through 7 (○).

When the color pigment was added in the amount of 5% in Sample 2, the adhesive was not adequately colored, and coloration was difficult to identify from the outside (Δ), whereas in Samples 3 through 9, in which the color pigment was added in the amount of 10% or more, the adhesive was colored, allowing identification from the outside (○).

Samples 2 through 6 were devoid of bubbles, and the laminate strength thereof was unchanged from that of Sample 1. Sample 7 was devoid of bubbles but had reduced laminate strength.

Based on the above results, it is apparent that an electrochemical cell packaging material formed by adding 10% or more and 30% or less of titanium oxide as a color pigment to a polyester-based adhesive functions as an identification mark that is difficult to forge and whose color is recognizable from the outside, and that heat applied in a sealing step subsequent to molding does not cause interlayer peeling and consequent formation of bubbles or wrinkles.

| List of Reference Signs | |
|---|---|
| 10, 110 | electrochemical cell packaging material |
| 11, 111 | base layer |
| 11a | matte varnish layer |
| 11b | oriented polyester film |
| 11c | printed layer |
| 11d | bonded layer |
| 11e | oriented nylon film |
| 12, 112 | metal foil layer |
| 12a, 112a | chemical conversion layer |
| 13, 113 | adhesive layer |
| 14, 114 | acid-modified polyolefin layer |
| 15, 115 | heat-sealable layer |
| 120 | exterior body |
| 120a | tray |
| 120b | sheet |
| 121 | lithium ion battery |
| 122 | lithium ion battery body |

The invention claimed is:

1. An electrochemical cell packaging material for housing an electrochemical cell body, the electrochemical cell body including a positive electrode comprising a positive-electrode active material and a positive-electrode collector, a negative electrode comprising a negative-electrode active material and a negative-electrode collector, and an electrolyte filled between said positive electrode and said negative electrode; and sealing said electrochemical cell body by heat-sealing of a peripheral edge part of the electrochemical cell packaging material; said electrochemical cell packaging material characterized in that the electrochemical cell packaging material is a multilayer film having a structure formed by laminating at least a base layer, an adhesive layer, a metal foil layer, and a heat-sealable layer in this order;

in said peripheral edge part, parts of said heat-sealable layer arranged as an innermost layer are made to face each other and are heat sealed together;

said adhesive layer which bonds together said base layer arranged as an outermost layer and said metal foil layer includes an identification mark; and said identification mark is composed of an adhesive to which a color pigment is added to give a solids content of 5 wt % or greater and 30 wt % or less.

2. The electrochemical cell packaging material according to claim 1, characterized in that said base layer has an oriented polyester film and an oriented nylon film; and a printed layer is provided on a surface of said oriented polyester film that faces said oriented nylon film.

3. The electrochemical cell packaging material according to claim 1, characterized in that said base layer has an oriented polyester film and an oriented nylon film; and a colored bonded layer is interposed between said oriented polyester film and said oriented nylon film.

4. The electrochemical cell packaging material according to claim 1, characterized in that said base layer comprises a colored oriented nylon film.

5. The electrochemical cell packaging material according to claim 1, characterized in that an unevenness is applied to a metal foil surface that constitutes said metal foil layer.

6. The electrochemical cell packaging material according to claim 3, characterized in that said adhesive layer is formed by including a pearl pigment in a constituent resin.

7. The electrochemical cell packaging material according to claim 3, characterized in that said adhesive layer is formed by including a fluorescent pigment in a constituent resin.

8. The electrochemical cell packaging material according to claim 1, characterized in that a matte varnish layer is formed on said base layer.

9. The electrochemical cell packaging material according to claim 1, characterized in that a matte treatment is applied on said base layer to impart a predetermined surface roughness to a surface thereof.

10. The electrochemical cell packaging material according to claim 1, wherein said adhesive is one selected from the group consisting of a polyvinyl acetate-based adhesive, a polyacrylic acid ester-based adhesive, a cyanoacrylate-based adhesive, an ethylene copolymer-based adhesive, a cellulose-based adhesive, a polyester-based adhesive, a polyamide-based adhesive, a polyimide-based adhesive, an amino resin-based adhesive, a phenol resin-based adhesive, an epoxy-based adhesive, a polyurethane-based adhesive, a reactive (meth)acrylic-based adhesive, a silicone-based adhesive, and an inorganic-based adhesive.

* * * * *